May 30, 1950   C. P. BALDWIN   2,509,953
POWER-OPERATED STEERING MECHANISM
Filed Aug. 31, 1945   5 Sheets-Sheet 1

Inventor:
Clyde P. Baldwin.
by Charles F. Ogord.
Atty.

May 30, 1950   C. P. BALDWIN   2,509,953
POWER-OPERATED STEERING MECHANISM
Filed Aug. 31, 1945   5 Sheets-Sheet 2
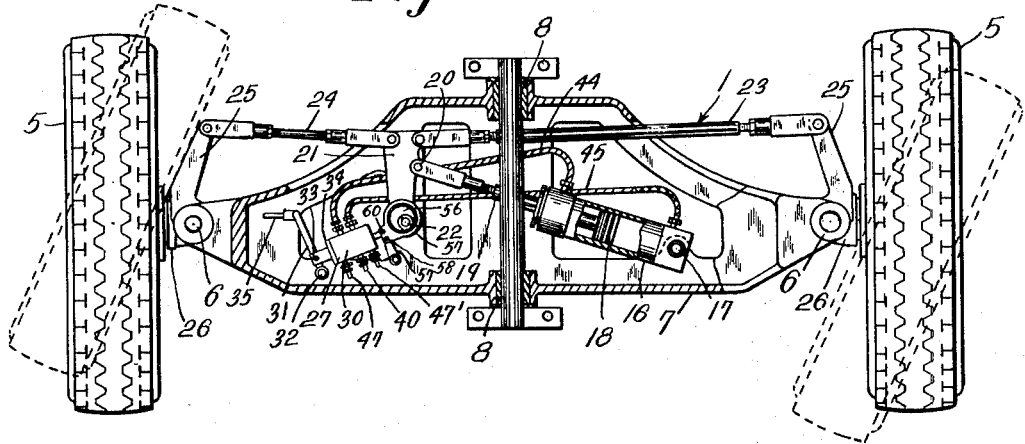
Fig. 2.
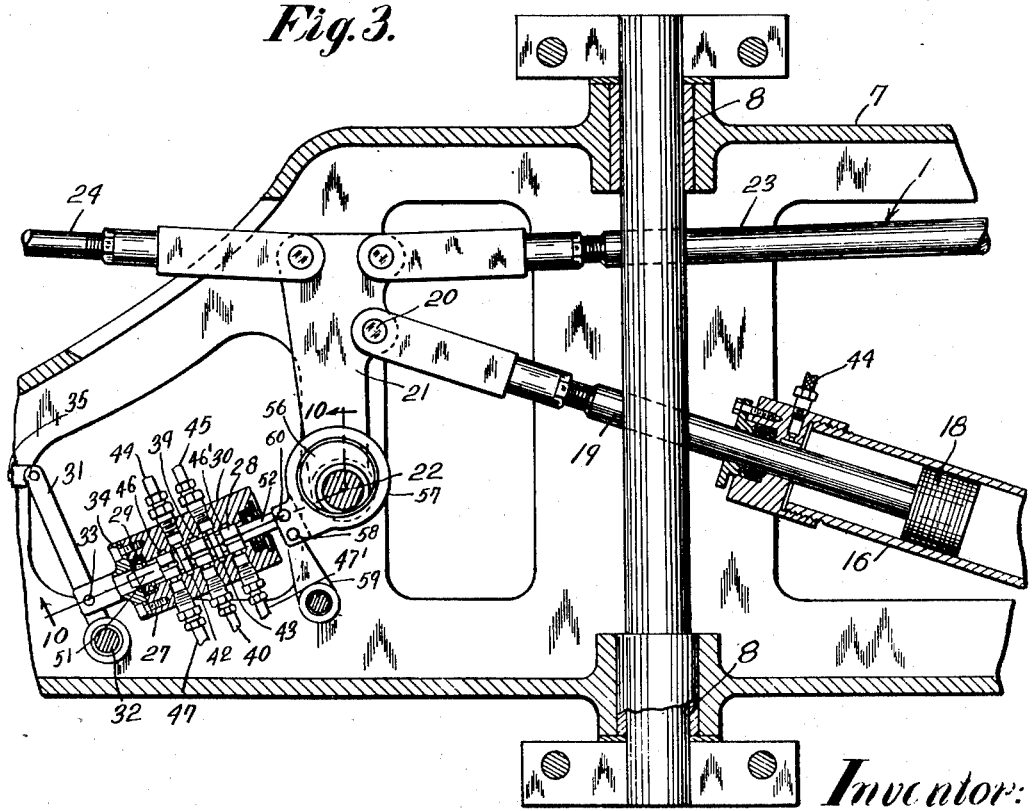
Fig. 3.
Inventor:
Clyde P. Baldwin.
by Charles F. Osgood,
Att'y.

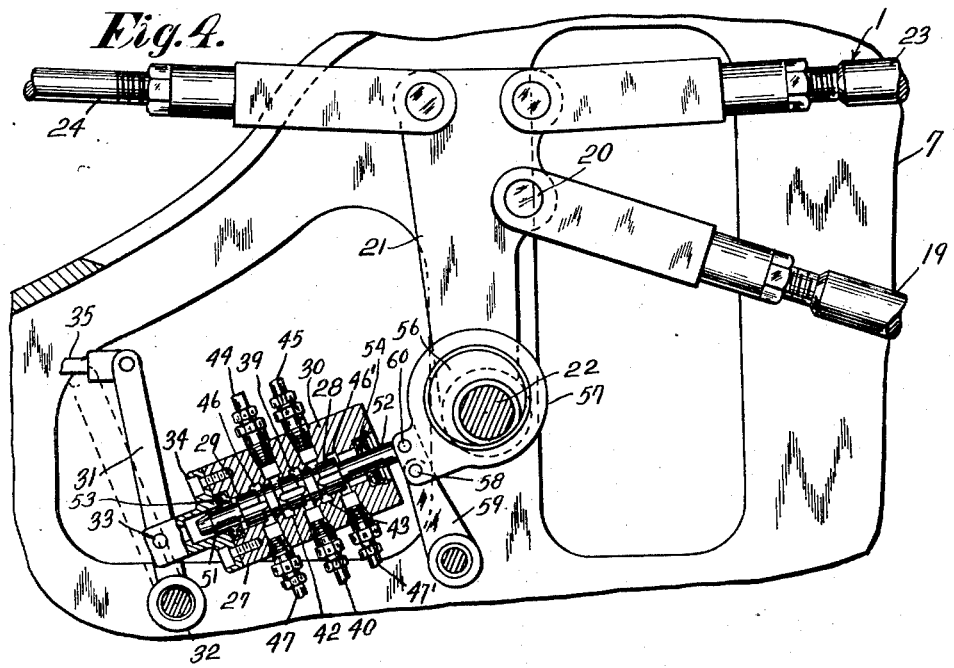
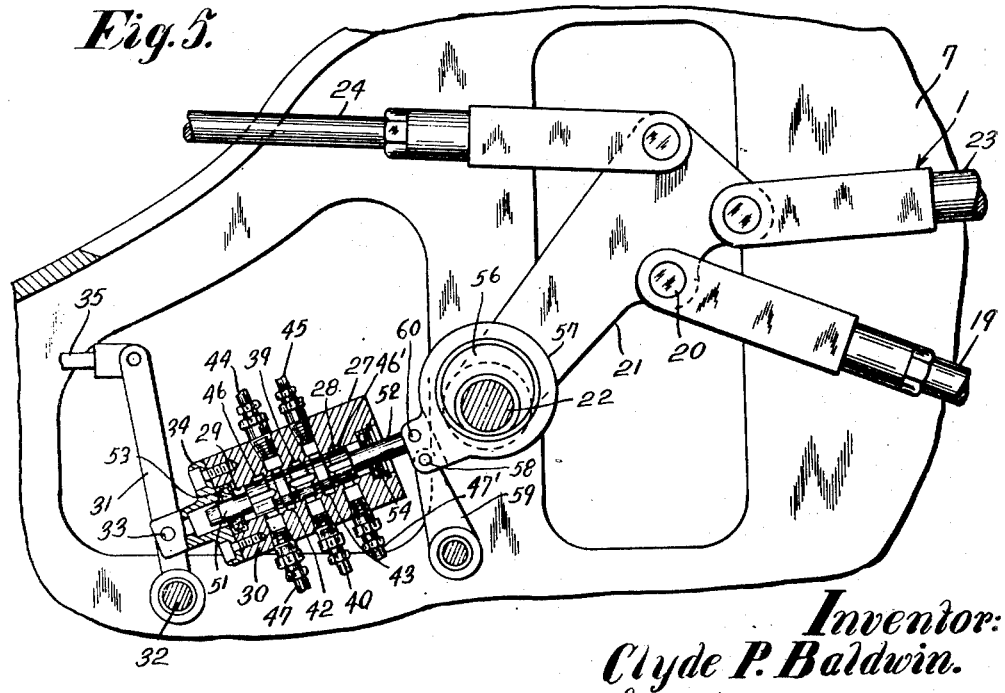

Inventor:
Clyde P. Baldwin.
by Charles F. Osgood.
Atty.

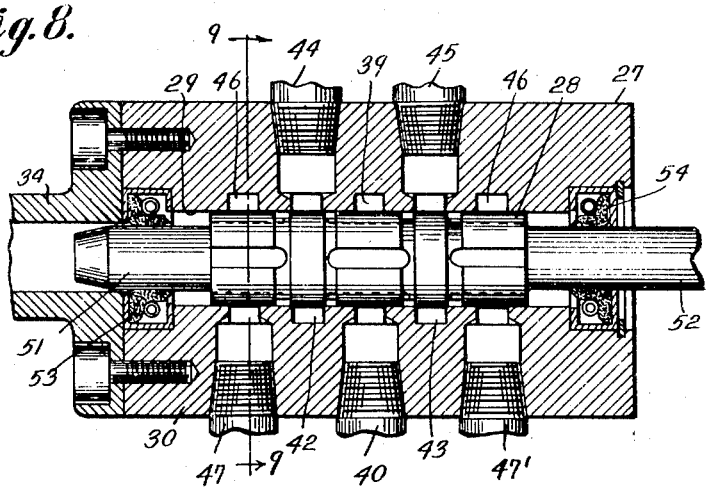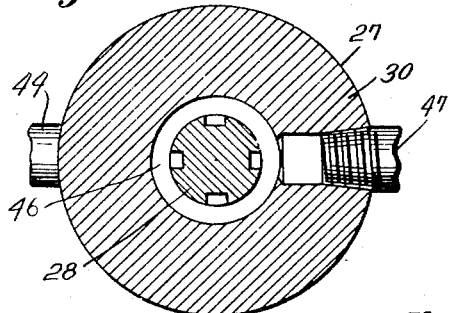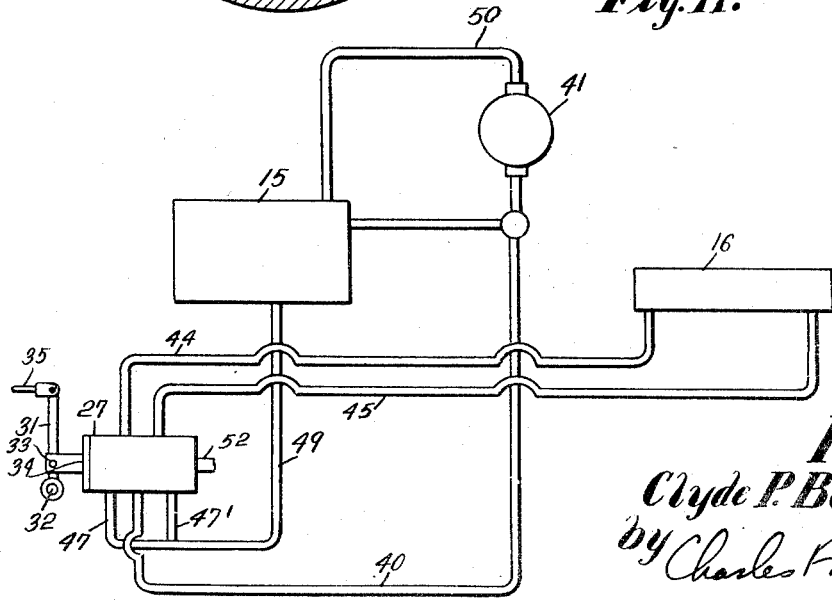

Patented May 30, 1950

2,509,953

UNITED STATES PATENT OFFICE 2,509,953

POWER-OPERATED STEERING MECHANISM

Clyde P. Baldwin, Claremont, N. H., assignor to Joy Manufacturing Company, a corporation of Pennsylvania Application August 31, 1945, Serial No. 613,746

9 Claims. (Cl. 180—79.2)

This invention relates to steering mechanism for automotive vehicles and more particularly to an improved power operated steering mechanism having improved control means.

In the steering mechanism of an automotive vehicle, the steering wheels are ofttimes operated through fluid operated linkage under the control of a valve mechanism, and in many such steering gears, when the control valve is opened, the steering wheels are turned by power until the control valve is operated to interrupt such turning movement, and unless some automatic control is provided, the control valve must be repeatedly manipulated during steering and the steering wheels are frequently inadvertently moved too little or too far, making steering of the vehicle difficult and unreliable. To overcome this difficulty, an automatic follow-up mechanism may be provided so that turning of the steering wheels is automatically discontinued when the wheels have turned a distance predetermined by the control valve, thereby eliminating undesired undermovement or overmovement of the steering gear. Thus the steering wheels may be operated to move through a predetermined angle under the control of the control valve, and when the steering wheels have turned through such predetermined range, the control valve is actuated automatically to interrupt further turning of the wheels. By comparatively simple manipulations of the control valve, the steering wheels may be turned by power in either direction as desired and under perfect control.

It is an object of the present invention to provide an improved control means for the power operated steering gear of an automotive vehicle. Another object is to provide an improved control mechanism for fluid operated steering gear. Another object is to provide an improved follow-up mechanism associated with the steering gear whereby when the steering gear is moved through a predetermined distance, it is automatically stopped, therefore to prevent undermovement or overmovement. Yet another object is to provide an improved follow-up mechanism associated with the control valve and actuated by an element of the steering gear whereby when the steering wheels have moved through a predetermined angle, the flow of operating fluid to the operating cylinder of the steering gear is automatically cut off. A still further object is to provide an improved follow-up mechanism associated with a control device embodying a control valve operatively connected to the steering gear linkage for actuation thereby and contained in a manually actuatable valve casing for regulating the flow of operating fluid to the steering cylinder. Yet another object is to provide a control valve device actuated through an eccentric mechanism operatively connected to the steering gear linkage whereby when the steering gear linkage has moved a predetermined amount, the valve device is automatically actuated to interrupt further movement. A further object is to provide a novel steering mechanism having a novel arrangement and combination of parts. These and other objects and advantages of the invention will, however, hereinafter more fully appear.

In the accompanying drawings there is shown for purposes of illustration one form which the invention may assume in practice.

In these drawings:

Fig. 2 is an enlarged horizontal sectional view through the steering gear with which the improved control means is associated.

Fig. 3 is an enlarged fragmentary sectional view taken on the plane of Fig. 2, showing the steering cylinder and control valve mechanism, with the parts in neutral or central position.

Fig. 4 is an enlarged fragmentary view taken on the plane of Fig. 3, showing the control valve mechanism in a position to effect turning of the steering wheels toward the right.

Fig. 5 is a sectional view similar to Fig. 4, showing the follow-up mechanism in a position to effect positioning of the control valve to interrupt fluid supply to the steering cylinder.

Fig. 8 is an enlarged sectional view taken longitudinally through the control valve mechanism.

Fig. 9 is a cross sectional view taken on line 9—9 of Fig. 8.

Fig. 11 is a diagrammatic view illustrating the fluid system.

Figure 1:
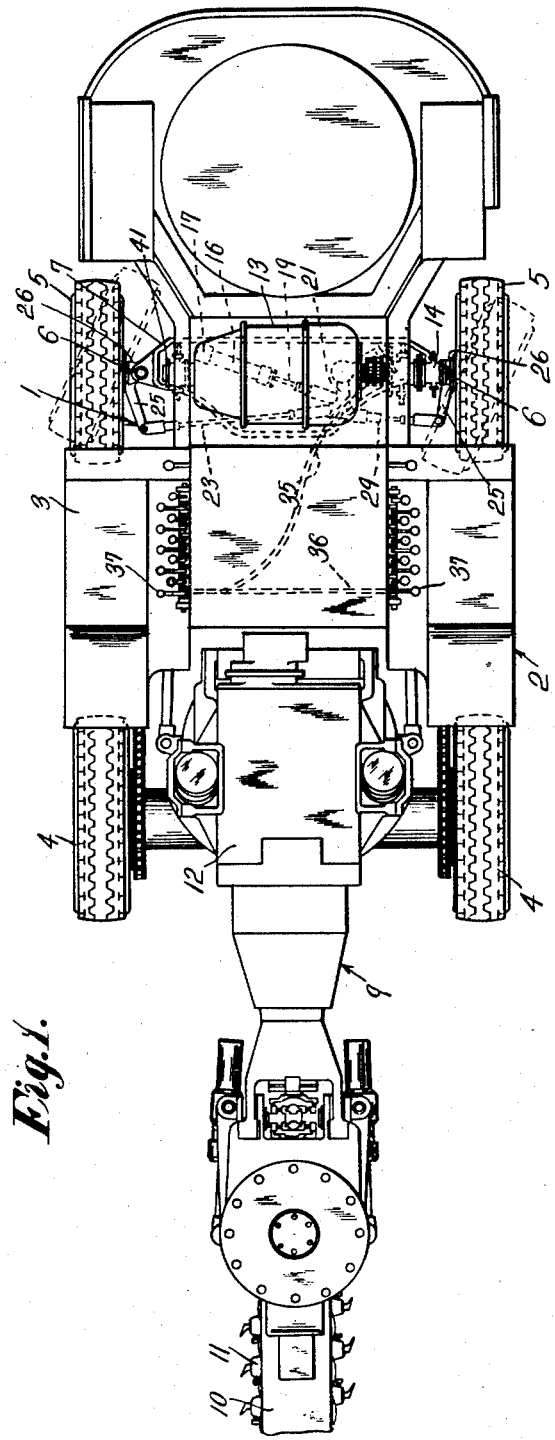
Fig. 1 is a plan view of an automotive vehicle in which an illustrative form of the invention is embodied.
Figure 10:
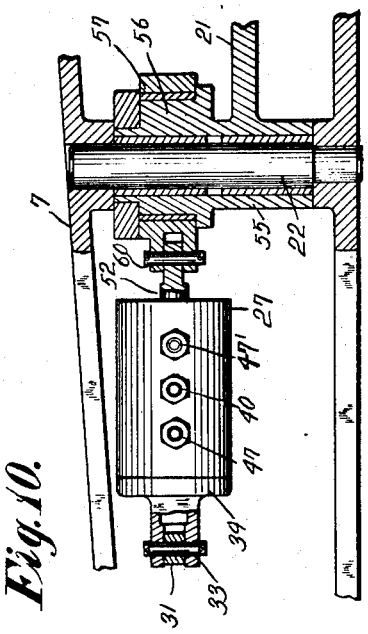
Fig. 10 is an enlarged vertical sectional view taken on lines 10—10 of Fig. 3, illustrating details of the follow-up mechanism.

In this illustrative form of the invention, the improved steering gear, generally designated 1, is embodied in an automotive vehicle, generally designated 2, which may assume the form of a coal cutting machine of a character similar to that disclosed in a copending application, Serial No. 578,084, filed February 15, 1945, in which I am one of the co-inventors. It will be evident, however, that the invention may be incorporated in other types of apparatus.

The coal cutting machine 2 is of the so-called universal type especially designed for use in trackless coal mines and generally comprises a portable base 3 mounted on rubber tired wheels adapted to travel over the floor of a mine. The front wheels 4, 4 are motor driven traction wheels and the rear wheels 5, 5 are steering wheels, and the latter are swiveled at 6 at the ends of a transverse axle 7. The axle 7 is pivoted at 8 at the longitudinal vertical center of the machine to rock about a horizontal, longitudinally extending axis, thereby to compensate for the unevenness of the mine floor. Supported by the base 3 is an adjustable kerf cutting mechanism generally designated 9 embodying a conventional cutter bar 10 having an endless cutter chain 11 guided for recirculation about its margin. A motor 12 serves to drive the cutter chain 11, and arranged on the base rearwardly of the kerf cutting mechanism is a motor 13 which serves to drive a pump 14 for pumping fluid under pressure from a tank 15 to certain of the fluid operated devices of the machine. As the structure of the kerf cutting mechanism does not per se enter into the present invention, and is fully described in the copending application above referred to, further description thereof is herein unnecessary.

As is also fully described in the copending application above referred to, the pivoted axle 7, by which the rear steering wheels 5, 5 are carried, has a fluid cylinder 16 pivotally mounted at 17 on an upright axis on the axle and containing a reciprocable piston 18. The piston has its piston rod 19 pivotally connected at 20 to a lever 21 which is, in turn, pivotally supported on a vertical shaft 22 suitably carried by the axle. Cross rods 23 and 24 connect the lever 21 to arms 25, 25 integral with the swivelled axle frames 26 on which the steering wheels are journaled. Thus when fluid under pressure is supplied to one end or the other of the fluid cylinder 16, the steering wheels 5, 5 may be turned on their swivel mountings as desired through the connections 19, 21, 23 and 24.

The supply of fluid under pressure to the steering cylinder 16 is controlled by a valve mechanism 27 which is under operator control and arranged within the frame of the axle 7, as shown in Fig. 2. This valve mechanism may assume various forms but herein comprises a slide valve 28 contained in a bore 29 of a valve casing 30. An operating lever 31 is pivoted at 32 on the axle frame and is pivotally connected at 33 to a head 34 secured to the valve casing. This lever 31 may be swung to effect movement of the valve casing relative to the valve through a flexible operating connection 35 arranged for actuation by a cross rod 36 extending, as shown in Fig. 1, across the top of the machine and having conveniently located handles 37, 37. As shown in Fig. 8, the valve receiving bore 29 has an annular groove 39 communicating therewith midway between its ends, and this groove is connected by a flexible conduit 40 to the discharge side of a pump 41 driven by the motor 13. Also communicating with the bore 29 at opposite sides of and spaced equidistantly from the groove 39, are annular grooves 42 and 43 connected by flexible conduits 44 and 45 to the opposite ends of the steering cylinder 16. Annular grooves 46 and 46', communicating with the bore 29 intermediate the grooves 42, 43 and the ends of the bore, are connected by conduits 47 and 47' to a flexible conduit 49 leading to the fluid tank 15. The pump intake is connected by a conduit 50 to the tank 15. The slide valve 28 is of the well-known balanced spool type having reduced stem portions 51, 52 which are sealingly engaged by suitable packings 53 and 54, respectively, as clearly shown in Fig. 8.

Now referring to the improved follow-up mechanism associated with the linkage of the steering gear and the valve mechanism for automatically interrupting fluid supply to the steering cylinder 16 when the steering wheels assume a predetermined position, it will be noted that formed integral with the hub 55 of the lever 21 is an eccentric or crank 56 surrounded by an eccentric strap 57, the latter pivotally connected at 58 to a lever 59 in turn pivotally mounted on the axle frame. The lever 59 maintains the eccentric strap in a predetermined angular relation as the eccentric is turned. The strap 57 is also pivotally connected at 60 to the inner stem portion 52 of the control valve 28.

Figure 6:
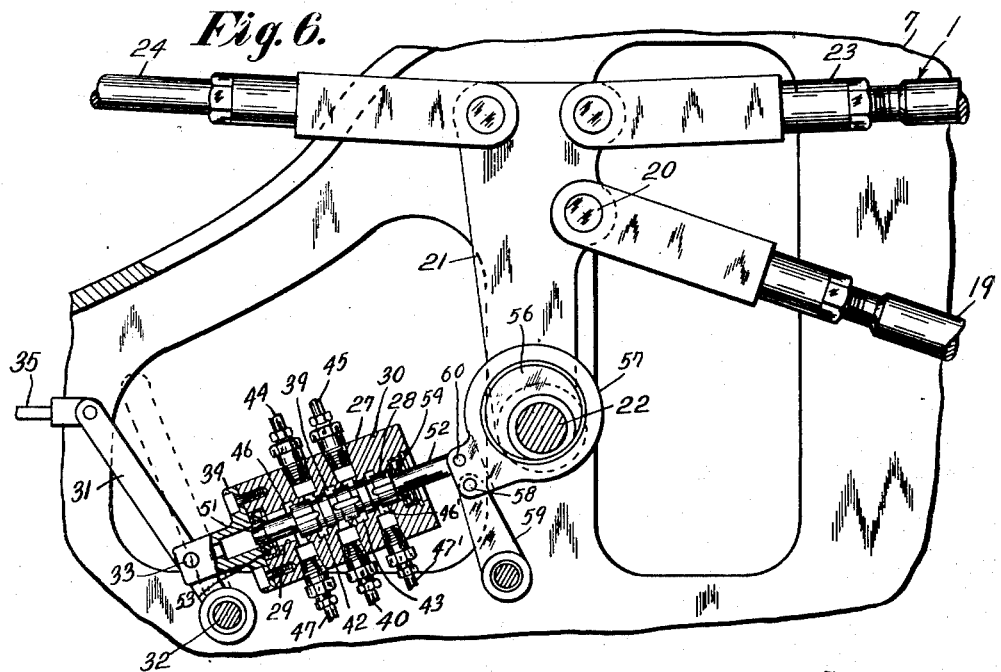
Fig. 6 is a sectional view similar to Fig. 4, showing the control valve in a position to effect turning of the steering wheels toward the left.
Figure 7:
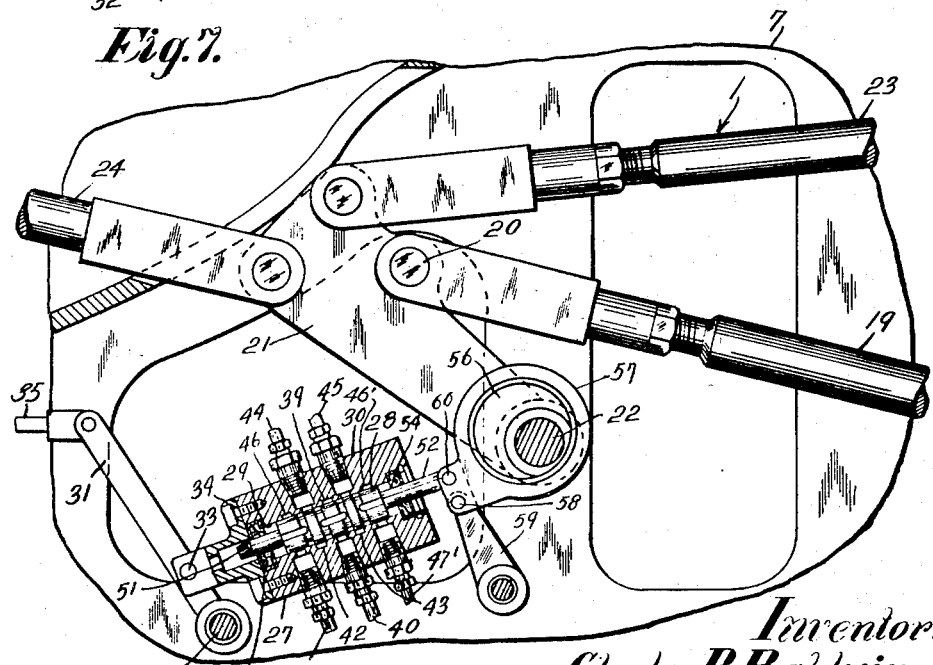
Fig. 7 is a view similar to Fig. 6, showing the follow-up mechanism in a position to effect positioning of the control valve to interrupt fluid supply to the steering cylinder.

The mode of operation of the improved steering mechanism will be clearly apparent from the description given. When the operating lever 31 is swung from its neutral or central position, indicated in dotted lines in Fig. 4, to the right-hand position indicated in full lines in that figure, the valve casing 30 assumes a position with respect to the valve 28 to admit fluid under pressure from the supply conduit 40 to the groove 39 to permit flow past the valve to the groove 42 communicating with the conduit 44 leading to the left-hand end of the steering cylinder 16, as shown in Figs. 2 and 3, thereby to move the piston 18 toward the right to effect swinging of the steering wheels 5, 5 toward the dotted line position shown in Fig. 2. As the steering gear 21, 23, 24 is actuated by the piston, the lever 21 is swung toward the right, thereby turning the eccentric 56 to effect movement of the eccentric strap 57 together with the control valve 28 so that when the steering wheels assume the position predetermined by the operator, the control valve is moved from the position shown in Fig. 4 to the position shown in Fig. 5, interrupting the flow of fluid to the steering cylinder and stopping further turning of the steering wheels. When the operator shifts the lever 31 from its neutral or central position, indicated in dotted lines in Fig. 6, toward the left to the full line position in that figure, the valve casing 30 assumes a position with respect to the control valve wherein fluid may flow from the supply conduit past the valve to the conduit 45 leading to the right-hand end of the steering cylinder 16, as shown in Fig. 2, thereby to move the piston 18 toward the left to effect turning of the steering wheels in the left-hand direction. As the steering gear 21, 23, 24 is actuated by the piston, the lever 21 is swung toward the left, thereby turning the eccentric 56 to effect movement of the eccentric strap 57 together with the control valve so that when the steering wheels assume the position predetermined by the operator, the control valve is moved to the position shown in Fig. 7 to interrupt the flow of fluid to the cylinder and stopping further turning of the steering wheels. It will thus be seen that the steering wheels may be turned by power in one direction or the other as desired, and the amount of turning movement of the wheels is predetermined by the operator by moving the control valve mechanism into the desired position, and when the predetermined position is reached, the follow-up mechanism automatically closes the valve so that turning of the steering wheels automatically ceases. For example, when the control valve is opened a slight distance, the fluid cylinder 16 operates to turn the steering wheels a correspondingly slight distance; and when the predetermined position of the steering wheels is assumed, the control valve is operated automatically to interrupt further flow of operating fluid to the steering cylinder. When the valve is in wide open position, the wheels are turned by the power cylinder through their full distance of travel, one position of which is indicated in dotted lines in Fig. 1. The control valve may be set to effect movement of the steering wheels into any desired intermediate position.

As a result of this invention, an improved power steering mechanism is provided, having improved control means for regulating the turning movement of the steering wheels so that the possibility of inadvertent overmovement or undermovement of the steering wheels is automatically eliminated. By the provision of the improved follow-up mechanism associated with the steering gear and the control valve mechanism, when the steering wheels have been turned through a predetermined distance, the supply of power to the steering cylinder is automatically interrupted so that further swinging of the wheels is discontinued. By arranging and constructing the valve mechanism in the manner disclosed, and by the provision of the follow-up mechanism embodying an eccentric actuated by the steering gear, steering of the vehicle is substantially improved. These and other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a steering mechanism, an axle pivoted between its ends to rock about a horizontal axis, steering wheels swiveled at the ends of said axle, a power cylinder device carried by said axle, linkage operated by said cylinder device for turning said wheels about their swivels on said axle, a valve casing carried by said axle and having a bore, a control valve contained in said bore, and operating means for shifting said casing relative to said valve to control the flow of fluid medium to said cylinder device.

2. In a steering mechanism, an axle pivoted between its ends to rock about a horizontal axis, steering wheels swiveled at the ends of said axle, a power cylinder device carried by said axle, linkage operated by said cylinder device for turning said wheels about their swivels on said axle, a valve casing carried by said axle and having a bore, a control valve contained in said bore, operating means for shifting said casing relative to said valve to control the flow of fluid medium to said cylinder device, and a follow-up mechanism actuated by said linkage and operatively connected to said valve for shifting the latter relative to said casing to interrupt flow of operating medium to said cylinder device when said wheels have turned through a predetermined angle.

3. In a power operated steering mechanism, an axle, steering wheels swiveled thereon, a power medium operated device connected to said axle, a steering gear actuated by said power device and including a pivoted element on said axle operatively connected to said wheels, control means for controlling the flow of operating medium to said power device, and means actuated by said pivoted element of said steering gear and associated with said control means for interrupting flow of operating medium to said power device when said steering wheels have turned through a predetermined angle as determined by said control means.

4. In a power operated steering mechanism, a steering gear embodying a pivoted lever operatively connected to steering wheels, a fluid operated device operatively connected to said steering gear for actuating the latter to turn the wheels, control valve means for controlling said fluid operated device for predetermining the range of movement of said steering gear, and means for actuating said control means during steering for automatically interrupting operation of said fluid operated device to discontinue movement of said steering gear when said predetermined range is attained, said actuating means including an eccentric actuated by said lever, a cooperating eccentric strap operatively connected to said control valve means, and means for controlling the angular relation of said eccentric strap as said eccentric is turned.

5. In a steering mechanism, a steering gear embodying linkage operatively connected to turnable steering wheels, a fluid operated device operatively connected to said steering gear for turning the steering wheels, valve means for controlling said fluid operated device including a valve casing having a bore and a control valve contained in said bore, operator controlled operating means for shifting said casing relative to said valve to control the flow of fluid medium to said device, and a follow-up mechanism actuated by said linkage and operatively connected to said valve for shifting the latter relative to said casing in said casing bore to interrupt flow of operating medium to said device when the steering wheels have turned through a predetermined angle, said follow-up mechanism including an eccentric actuated by said linkage and a cooperating element actuated by said eccentric and having limited, controlled, angular movement upon turning of said eccentric and operatively connected to said valve.

6. In a power operated steering mechanism, a steering gear embodying a frame and a lever pivoted on said frame, a fluid operated actuating device mounted on said frame and operatively connected to said lever for actuating the steering gear and to which operating fluid is adapted to be supplied, control means for controlling flow of operating fluid to and from said power device for controlling the operation of the latter comprising relatively movable coaxial control elements for predetermining the range of movement of the steering gear, one control element comprising a valve casing having a bore and the other comprising a valve reciprocable in said valve casing bore, operator controlled means comprising a second lever pivoted on said frame and connected to one of said control elements for actuating said latter element relative to said other element to effect initiation of the supply of operating fluid to said actuating device, and means operated by said first mentioned lever during actuation of said steering gear for actuating said other control element relative to said one control element for automatically effecting interruption of flow of operating fluid to said actuating device when said predetermined range of movement of said steering gear is attained.

7. In a power operated steering mechanism, a steering gear embodying a frame and a lever pivotally mounted on said frame and operatively connected to steering wheels, a fluid operated device on said frame and operatively connected to said steering gear for actuating the latter to turn the wheels, control valve means for controlling said fluid operated device for predetermining the range of movement of said steering gear, and means for actuating said control means during steering for automatically interrupting operation of said fluid operated device to discontinue movement of said steering gear when said predetermined range is attained, said actuating means including an eccentric actuated by said lever, a cooperating eccentric strap operatively connected to said control valve means, and means for controlling the angular relation of said eccentric strap as said eccentric is turned, said controlling means comprising a lever having at one end a fixed pivot on said frame and at its opposite end pivotally connected to said eccentric strap.

8. In a steering mechanism, a steering gear embodying a frame and linkage mounted on said frame operatively connected to turnable steering wheels, a fluid operated device mounted on said frame and operatively connected to said steering gear for turning the steering wheels, valve means for controlling said fluid operated device including a valve casing having a bore and a control valve contained in said bore, operator controlled operating means for shifting said casing relative to said valve to control the flow of operating fluid to said device, and a follow-up mechanism mounted on said frame and actuated by said linkage and operatively connected to said valve for shifting the latter relative to said casing in said bore to interrupt flow of operating medium to said device when the steering wheels have turned through a predetermined angle, said follow-up mechanism including an eccentric actuated by said linkage and a cooperating element actuated by said eccentric and having limited, controlled, angular movement upon turning of said eccentric and operatively connected to said valve, and means for controlling the angular movement of said eccentric actuated element including a lever having at one end a fixed pivot on said frame and at its opposite end pivotally connected to said element.

9. In a power operated steering mechanism, an axle, steering wheels swiveled thereon, a power device operatively connected to said axle and to which operating medium is adapted to be supplied to affect operation thereof, a steering gear operatively connected to and actuated by said power device and including an element pivoted on said axle and operatively connected to said wheels, control means for controlling the flow of operating medium to said power device, and means embodying an eccentric actuated by said pivoted element of said steering gear and means including an eccentric strap surrounding and rotatably engaging said eccentric and associated with said control means for interrupting flow of operating medium to said power device when said steering wheels have turned through a predetermined angle as determined by said control means.

CLYDE P. BALDWIN.

REFERENCES CITED

The following references are of record in the file of this patent:

UNITED STATES PATENTS

| Number | Name | Date |
|---|---|---|
| 1,454,396 | MacDonald | May 8, 1923 |
| 1,474,527 | Hunt | Nov. 20, 1923 |
| 1,657,412 | Schneider | Jan. 24, 1928 |
| 1,874,248 | Davis | Aug. 20, 1932 |
| 2,072,203 | Fuller | Mar. 2, 1937 |
| 2,152,021 | Baumer | Mar. 28, 1939 |

FOREIGN PATENTS

| Number | Country | Date |
|---|---|---|
| 929 | Great Britain | Apr. 3, 1857 |
| 629,649 | France | Aug. 1, 1927 |